Figure 1:
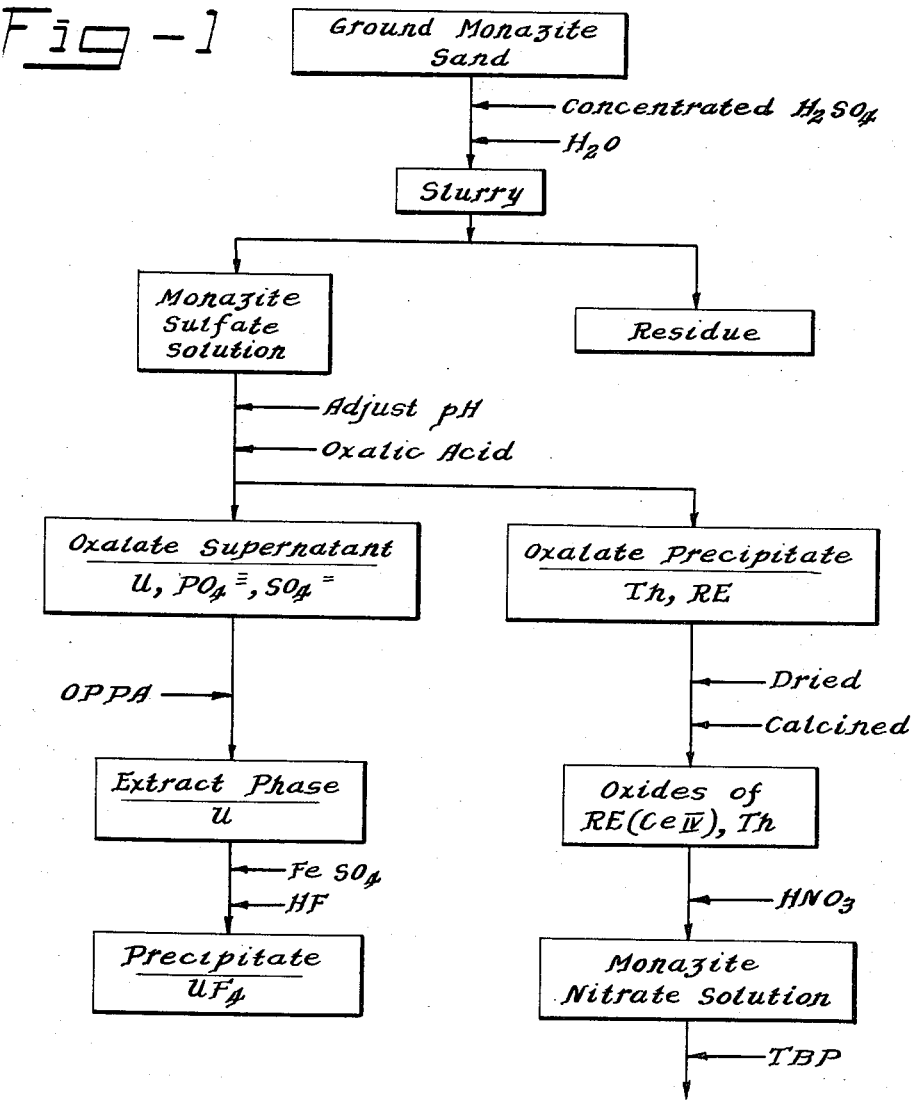

Aug. 26, 1958

M. A. WELT ET AL 2,849,286

METHOD OF PROCESSING MONAZITE SAND

Filed Dec. 2, 1957

2 Sheets-Sheet 1

Legend:
 RE = Rare Earths
 OPPA = Octyl Pyrophosphoric Acid
 TBP = Tributyl Phosphate INVENTORS
Martin Welt
Morton Smutz
BY
Roland A. Anderson
Attorney

United States Patent Office 2,849,286
Patented Aug. 26, 1958

2,849,286

METHOD OF PROCESSING MONAZITE SAND

Martin A. Welt, Brooklyn, N. Y., and Morton Smutz, Ames, Iowa, assignors to the United States of America as represented by the United States Atomic Energy Commission Application December 2, 1957, Serial No. 700,240

19 Claims. (Cl. 23—14.5)

This invention deals with a process of recovering thorium, uranium and rare earth values from ores, and in particular from monazite sand.

Monazite sand is a mixture of various phosphates and silicates, in particular those of thorium, uranium and rare earths, which are the rare earths having atomic numbers of between 57 and 71. The predominant component of the rare earths is cerium which often constitutes up to 50 percent of the total rare earths content. Florida monazite sand, for instance, contains about 70 percent of the monazite mineral, which in turn averages 3.1 percent of thorium expressed as $ThO_2$, 0.47 percent of uranium expressed as $U_3O_8$, 40.7 percent of rare earth oxides including cerous oxide, 19.3 percent of $P_2O_5$, 4.47 percent of $Fe_2O_3$ and 8.3 percent of $SiO_2$.

Many processes have been devised for the processing of monazite sand, some starting out with sodium hydroxide solutions and some with mineral acid, such as sulfuric acid, for the opening of the ore. In the case of sodium hydroxide, the uranium, thorium and rare earth values are obtained in the form of an undissolved residue, mainly of hydroxides, which has to be dissolved in acid for further processing. From these acid solutions, according to one process frequently used, the metal values to be rerecovered are fractionally precipitated from the acid solution by gradually increasing the pH to values of 1.05, 2.3 and 6 and separately removing the precipitates obtained in these ranges which contain the thorium, rare earths and uranium, respectively.

The process just described has the disadvantage that the precipitates obtained are rather gelatinous and contain, in the form of occlusions, a great part of the nonprecipitated salts from which the precipitated metals are to be separated. This, of course, impairs the degree of separation and the purity of the various precipitate fractions. For instance, uranium then is always present in substantial quantities in the rare earths fraction because of the flocculent or gelatinous nature of the precipitate. Moreover, flocculent precipitates are difficult to filter.

It is an object of this invention to provide a process of treating monazite sand by which the drawbacks set forth above are overcome.

It is an object of this invention to provide a process of treating monazite sand which is comparatively simple.

It is another object of this invention to provide a process of treating monazite sand in which separation of uranium from thorium and rare earths is accomplished at an early stage and to a high degree.

It is still another object of this invention to provide a process of treating monazites and which requires only one filtration step for the separation of uranium from the thorium and rare earth values.

It is furthermore an object of this invention to provide a process of treating monazite sand in which crystalline precipitates are obtained that are easy to separate.

It is finally also an object of this invention to provide a process of treating monazite sand wherein phosphate and sulfate anions, which often impair the separation of rare earths from each other and from thorium by solvent extraction, are removed from the rare earths and the thorium in the same step the uranium is removed.

These objects are accomplished by treating finely ground monazite sand containing uranium, thorium, and rare earth values, including cerium values, with concentrated sulfuric acid at elevated temperature whereby a slurry is obtained; diluting the slurry; separating the aqueous solution of the slurry, the "monazite sulfate solution," from the residue of the slurry; adjusting the acidity of said monazite sulfate solution to a pH value of between 0.4 and 3; adding oxalic acid to said monazite sulfate solution whereby the thorium and the rare earth values precipitate as oxalates; separating the oxalate precipitate from the "oxalate supernatant"; drying the oxalate precipitate; calcining the oxalate precipitate whereby the oxalates are converted to the oxides and the cerium to the tetravalent state; dissolving the calcined precipitate in nitric acid whereby a "monazite nitrate solution" is formed; contacting said monazite nitrate solution with tributyl phosphate whereby an organic extract phase containing the cerium and thorium values and an aqueous raffinate containing the other rare earth values are obtained; separating the organic extract phase from the aqueous raffinate; and back-extracting said cerium and thorium values from said organic extract phase with an aqueous medium.

The sulfuric acid for opening the ore should have a high concentration; for instance, a 93 percent sulfuric acid and also fuming sulfuric acid have given good results. The quantity of the sulfuric acid suitably ranges between 1.5 and 2.5 times the weight of monazite sand. The opening step should be carried out at elevated temperature; about 200° C. was the preferred temperature. The sulfuric acid-monazite mixture was agitated at that temperature until it had a pasty consistency; it was then allowed to cool to about 70° C.

The pasty mixture is then leached with water, using about 10 parts by weight of water, preferably ice water, for each part of monazite sand. A residue mainly consisting of undigested sand and silica is separated from the solution obtained, the monazite sulfate solution. This can be done by any means known to those skilled in the art, such as by decantation, filtration or centrifugation.

It was tried to extract the uranium and/or thorium directly from this monazite sulfate solution, but most solvents were found not to be selective enough and extracted a substantial amount of rare earth values. Tributyl phosphate proved to be the only exception and to be a good extractant for thorium, provided that the nitric acid concentration of the monazite sulfate solution was high. This necessity for large amounts of nitric acid, however, was a disadvantage.

According to this invention, separation is carried out by an oxalate precipitation whereby the rare earth and the thorium values are precipitated and thus separated from the uranium, which stays in solution. For this purpose the solution has to be adjusted to an acidity at which the oxalates have the lowest solubility. A pH value of from 0.4 to 3 was found to answer this requirement, but a pH value of between 1.1 and 1.5 was preferred. Adjustment of the pH value can be carried out by neutralization, e. g. with ammonia; however, ammonia was found to increase the solubility of the oxalates. It was preferred to adjust the pH value by dilution with water followed by the addition of ammonia. For dilution a quantity of from 4 to 4.5 volumes of water per each volume of monazite sulfate solution was usually used. The precipitation was uniform and the oxalates contained the least occlusion of sulfuric and phosphoric acid anions.

The oxalic acid anions are preferably added in the form of oxalic acid, a saturated aqueous solution thereof (about 10 percent) being preferred. The use of an excess amount of oxalic acid over that stoichiometrically required for conversion of all of the thorium and the rare earths present was found to be advisable. The solutions are thoroughly mixed by agitation and then allowed to stand for a few hours. Since, as was found out by experimentation, the temperature had no effect on the oxalate precipitation, this step is carried out at room temperature, which is about 25° C. The oxalate precipitates could be filtered readily and thus be separated from the "oxalate supernatant." The oxalate precipitates were washed with a dilute solution of oxalic acid. In this phase of the process the thorium and rare earth values are separated almost quantatively from the uranium and at the same time from sulfuric and phosphoric acid anions which otherwise would complicate the separation of the various rare earths from each other and from thorium by solvent extraction, if this is desired.

Table I below indirectly compares the settling times of the oxalate precipitate obtained by the process of this invention with those of a thorium precipitate, two rare earth precipitates (with and without a flocculating agent) and of a uranium precipitate obtained by the process previously used and based on pH adjustment, as has been described in the introduction of this specification. The actual data which Table I shows are the various heights of the interfaces after various periods of time which, of course, are indicative of the settling time.

TABLE I

| Time, minutes | Height of interface, inches | | | | |
| --- | --- | --- | --- | --- | --- |
| | Thorium | Rare earths a | Rare earths b | Uranium | Oxalates |
| 0 | 13.5 | 13.9 | 13.8 | 13.5 | 13.5 |
| 2 | 12.3 | | | 10.9 | 4.9 |
| 3 | 11.3 | 13.8 | 11.6 | | 2.2 |
| 5 | 9.1 | 13.7 | 10.0 | 8.4 | 1.8 |
| 10 | 6.1 | 13.3 | 7.7 | 6.4 | 1.6 | a No flocculating agent.
b Eighteen milligrams of "Knox" gelatin added per liter of slurry.

The above data clearly show the superiority of settling of the oxalate precipitate over settling of the four precipitates obtained by the process used heretofore.

The oxalate precipitate is then separated from the oxalate supernatant, for instance, by filtration; the latter is then processed for uranium recovery by solvent extraction. Sometimes it is advisable, though, first to concentrate the supernatant and to filter it for removal of any precipitated components. The supernatant is acidified to improve phase separation in the following solvent extraction step.

The solvent best suitable for the uranium extraction was found to be octyl pyrophosphoric acid, preferably in diluted form. Diethyl ether and kerosene are satisfactory diluents. A concentration of from 0.25 to 10 percent by volume of octyl pyrophosphoric acid in the diluent proved operative, a 10 percent solution in kerosene being the preferred extractant. Agitation intensifies contact and thus improves and/or expedites extraction.

The uranium is back-extracted or "stripped" from the octyl pyrophosphoric acid solution and simultaneously precipitated by contacting the octyl pyrophosphoric acid solution with an aqueous solution of hydrogen fluoride and a reducing agent. This is best done by introducing an aqueous hydrofluoric acid solution of, for instance, 48 percent, which contains ferrous sulfate as the reducing agent. A quantity of from 2.5 to 5 pounds of the 48 percent acid per one pound of $U_3O_8$ yielded good results. The precipitate of uranium tetrafluoride formed is separated from the solution, for instance, by centrifugation, and then dried at a temperature of about 125° C.

The oxalate precipitate is processed for the separation of thorium from the rare earths by extraction with tributyl phosphate. For this purpose the precipitate is first calcined at a temperature of about 500° C. whereby practically all cerium (about 98 percent) is converted to and/or secured in the tetravalent state and the oxalates are transformed to the oxides. The use of higher calcination temperatures is not advisable, because then dissolution of the cerium is difficult, even with concentrated nitric acid. The calcination step is necessary, because, it was found, direct nitration does not substantially convert the cerium to the tetravalent state.

The "calcined oxalates," the oxides, are then dissolved in an excess quantity (over the quantity stoichiometrically required for dissolution of all oxides) of nitric acid having a concentration of between 7 and 9 N, preferably of about 8 N. This concentration range of nitric acid is vital, because a lower concentration, for instance, a 6 N nitric acid, was found to react too slowly, while the use of concentrations higher than 9 N does not bring about an improvement and therefore is uneconomical. The "monazite nitrate solution" is obtained in this step.

Instead of calcining the oxalates, they can be digested, and thus metathesized, with alkali metal hydroxide whereby the oxalic acid is regenerated in the form of the alkali metal salt. The precipitated hydroxides are then dissolved in $HNO_3$ and extracted as described above.

Extraction of the tetravalent cerium and of the thorium is then carried out with tributyl phosphate, preferably in undiluted form and after it has been pre-equilibrated with 8 N nitric acid. The thorium is taken up by the solvent quantitatively and the cerium to at least 90 percent if extraction is properly carried out, for instance, as described in the example below. In this step the rare earths are freed from the cerium which is present in large quantities so that the separation of the rare earths from each other, if desired, and their recovery in pure form is easier. The tributyl phosphate phase is scrubbed, for further separation, with nitric acid of a concentration of about 8 N.

The tributyl phosphate extract phase thus obtained is then processed for the separation of cerium from thorium. Two methods have been successfully used, one being based on selective stripping of cerium followed by back-extraction of thorium, while the other method first co-strips both, the cerium and the thorium values.

In the first case, the tributyl phosphate solution is contacted with an aqueous solution of a reducing agent to back-extract the cerium selectively. The best suitable reducing agent for this purpose is sodium nitrite, and a solution as weak as 0.1 M was found sufficient. After back-extraction of the cerium in the trivalent state, the tributyl phosphate solution is contacted with water whereby the thorium is back-extracted.

If the coextraction of thorium plus cerium from the tributyl phosphate is desired, the latter is contacted with an about 2 percent sulfuric acid solution containing a small amount of sodium nitrite; the aqueous strip solution thus obtained is then concentrated by evaporation. Mesityl oxide was found to be a good selective extractant for thorium; with it the thorium extraction from the sulfuric acid strip solution was quantitative, in spite of the presence of sulfuric acid and phosphoric acid anions. Thorium extraction with mesityl oxide is considerably improved, though, if the sulfuric acid solution is saturated in aluminum nitrate. Normally neither trivalent nor tetravalent cerium are taken up by the mesityl oxide, but in the presence of high concentrations of aluminum nitrate as a salting-out agent cerium is also extracted.

The quantity of mesityl oxide may vary widely, but about equal volumes of the extractant and of the aqueous solution to be extracted are preferred. The mesityl oxide extract phase is then scrubbed with nitric acid containing some aluminum nitrate, for instance with a 15 percent nitric acid being 2 M in aluminum nitrate; three scrubs were usually carried out, each using equal volumes of scrubbing solution and mesityl oxide extract phase. In this step cerium is back-extracted into the nitric acid.

The mesityl oxide solution is then ready for the back-extraction of thorium with water; three stripping steps, each using a volume of water about equal to that of the mesityl oxide solution, were found to be sufficient.

The thorium can then be recovered from the aqueous strip solution, for instance, by precipitation as the oxalate. In the oxalate precipitation step a further decontamination is accomplished, in particular a decontamination from iron and titanium values.

Figure 2:
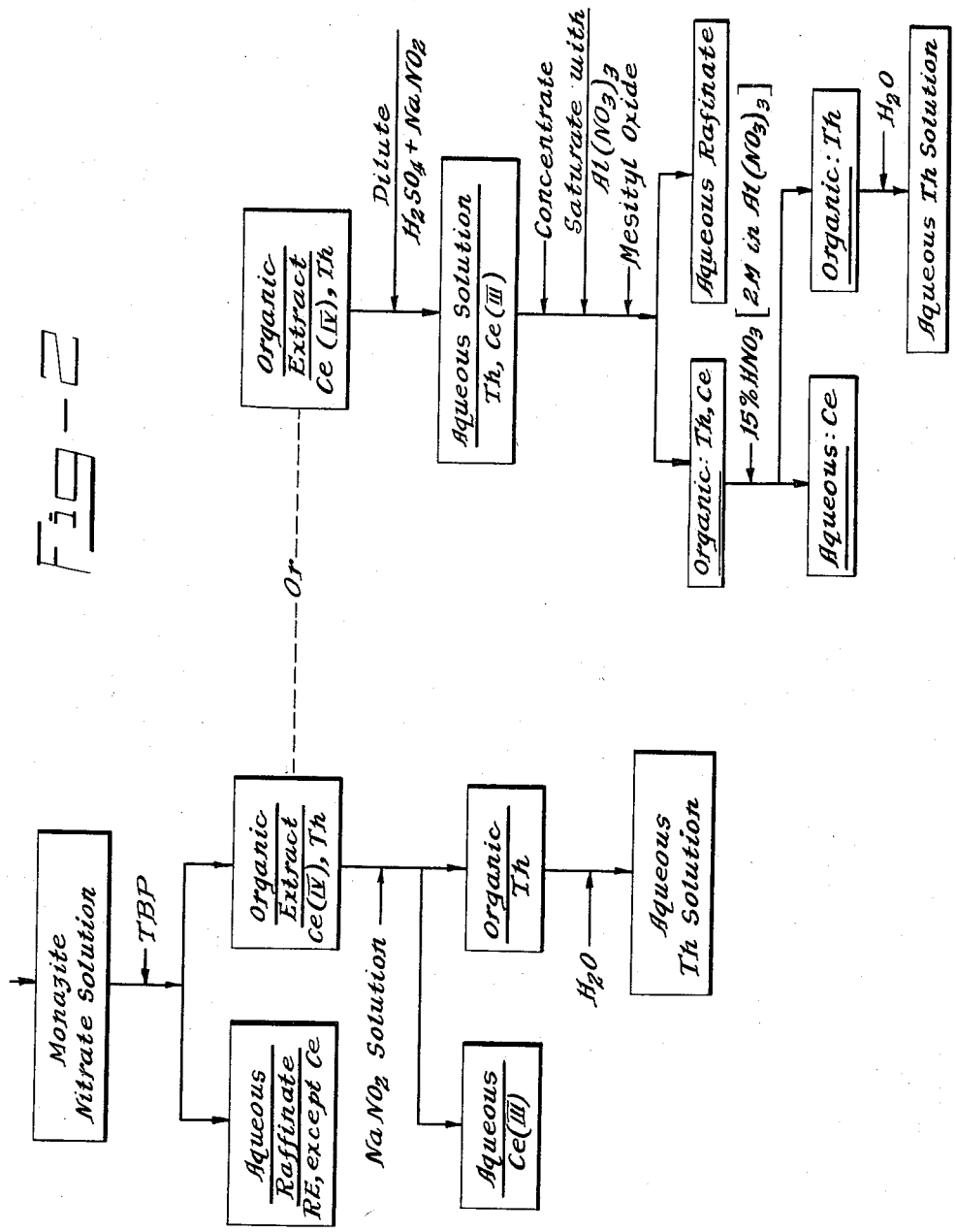

The attached drawings, Figs. 1 and 2, contain a flow-sheet of the process of this invention.

In the following an example is given to illustrate the process of this invention but not to limit it to the details given therein.

*Example*

A batch of 2008 g. of Brazilian monazite sand 95 percent of which had a particle size of —65 mesh were used. The monazite sand contained 6.31 percent thorium oxide, 57.6 percent rare earth oxides 26.8 percent of which was ceric oxide, 0.17 percent of $U_3O_8$, 26.0 percent of $P_2O_5$ and small quantities of ferric oxide, titanium oxide and silica. To this monazite was added 3110 g. of a 93-percent sulfuric acid, and the mixture was heated to 195° C. At this temperature the mixture was digested for two hours and 14 minutes whereupon it was cooled to 70° C. Thereafter 20 l. of ice water were added, and the mixture was filtered to remove the silica. The monazite sulfate solution obtained thereby was analyzed and found to contain 49.1 g. of thorium plus rare earth oxides per liter in the form of sulfates.

Eight liters of this monazite sulfate solution were diluted by the addition of 36 l. of water. A concentrated ammonia solution (28 percent of $NH_3$) was added until the pH value of the solution was 1.25; 750 ml. of the ammonia solution were necessary. Thereafter 3.75 l. of a 10-percent oxalic acid solution were added whereby a precipitate formed. This oxalate precipitate which contained the thorium and rare earths as oxalates was separated from the oxalate supernatant by filtration.

A 665-ml. fraction of the oxalate supernatant which was found to contain 0.17 g. of $U_3O_8$ was boiled down until the volume had been reduced to 100 ml. 63.5 ml. of a 10 percent solution of octyl pyrophosphoric acid in kerosene was added, and the liquids were mixed by agitation for 10 minutes. The organic extract phase was then allowed to settle from the aqueous raffinate and separated therefrom. 30 ml. of a 50-percent hydrofluoric acid which contained a total of about 0.5 g. of ferrous sulfate had been added to the octyl pyrophosphoric acid solution. A green precipitate of uranium tetrafluoride appeared at the interface of the two phases and then settled at the bottom of the container. The precipitate was dried at 125° C. and analyzed; it was found to contain 20 mg. of uranium tetrafluoride.

The oxalate precipitate was washed with a one-percent oxalic acid solution which was 0.2 N in nitric acid. The washed precipitate was then calcined at 500° C. for 18 hours whereby the oxalates were converted to the oxides. 417 g. of oxides were obtained. These oxides were then dissolved by digesting them in 3 l. of an 8.25 N nitric acid at a temperature of 70° C. A monazite nitrate solution was obtained which contained 139 g. of oxides per l. and which was 5.17 N in free nitric acid. The distribution of the oxides was as follows: 7.69 percent of $ThO_2$, 16.5 percent of $Nd_2O_3$, 4.7 percent of $Pr_6O_{11}$, 3.7 percent of $Sm_2O_3$, 41.06 percent of $CeO_2$ and 26.35 percent of $La_2O_3$.

A fraction of 900 ml. of this monazite nitrate solution was then extracted with undiluted tributyl phosphate which had been pre-equilibrated with an 8.25 N nitric acid. A so-called simulated countercurrent column operation with an 8-stage extractor consisting of eight separate vessels connected in series was used. The monazite nitrate solution, the feed, was introduced into the fifth container, the tributyl phosphate into the first and a scrubbing solution, an 8-N nitric acid, into the eighth container, this after each container had been precharged with the three types of solutions in the predetermined ratio intended for the "flow rates" in the extraction. This predetermined volume ratio for feed:tributyl phosphate:scrubbing solution was 1:5:2.5.

A sufficient number of cycles were carried out to extract all of the solution, each cycle comprising the introduction of 50 ml. of feed to container No. 5, of 250 ml. of tributyl phosphate into container No. 1 and 125 ml. of scrubbing acid into container No. 8; also, in each cycle the liquids in each container were thoroughly mixed by agitation, the phases were then allowed to separate, and each aqueous phase obtained was transferred to the next lower container, which is the container having the next lower number, while each organic phase was transferred to the next higher one. Finally, in each cycle the aqueous raffinates in container No. 1 and the final extract phases in container No. 8 were discharged.

The aqueous raffinate contained a total of 9.066 g. of oxides per l., 32.7 percent of which was $Nd_2O_3$, 9.7 percent $Pr_6O_{11}$, 4.1 percent $Sm_2O_3$, and 25.94 percent $CeO_2$; thorium could not be detected. The organic extract phase contained a total of 3.551 g. of oxides per liter in the form of the nitrates with a content of less than 0.2 percent of $Nd_2O_3$, less than 0.2 percent of $Pr_6O_{11}$, less than 0.5 percent of $Sm_2O_3$, a content of 74.1 percent of $CeO_2$ and 13.9 percent of $ThO_2$.

To this organic extract phase was then added 500 ml. of 0.1 M sodium nitrite solution. An aqueous solution and an organic solution were obtained. These two solutions were separated and analyzed by spectroscopy. The analysis is given in the table below:

TABLE II

| Components | Organic | Aqueous |
|---|---|---|
| Al | ND [1] | Very weak. |
| Ca | Trace | Trace. |
| Ce | ND | Very strong. |
| La | Trace | Faint trace. |
| Nd | ND | Strong. |
| Pr | Faint trace | Weak. |
| Sm | do | Medium. |
| V | ND | Weak. |
| Fe | ND | Very weak. |
| Ti | Faint trace | Very faint trace. |
| Th | Very strong | Trace. |

[1] ND—not detected.

The organic solution was then contacted with water, using 4 liters of water per liter of organic solution, whereby the thorium was back-extracted into the water.

Another 75 ml. of the monazite nitrate solution was processed by first contacting with 150 ml. of tributyl phosphate. The steps and conditions for this extraction were the same as in the previous extraction of the monazite nitrate solution with the exception that the quantities were adjusted to the smaller volume of monazite nitrate solution used. The organic extract phase was contacted three times with a 2-percent sulfuric acid to which a 0.1-N sodium nitrite solution had been added. For each contact a mixture of 100 ml. of the sulfuric acid and 30 ml. of the sodium nitrite was used. The aqueous solution obtained by these back-extractions was boiled down until it was reduced to a volume of 50 ml. While the solution was still boiling, 17 g. of aluminum nitrate was added and thereafter 10 drops of concentrated nitric acid to clarify the solution. The solution was then allowed to cool to room temperature.

Thereafter 40 ml. of mesityl oxide were added to the aqueous solution, and the two liquids were mixed by agitating for about 30 seconds. The aqueous solution was separated from the mesityl oxide phase. The mesityl oxide phase was scrubbed three times with 20 ml. of a 2 N nitric acid 2 M in aluminum nitrate. The aqueous solution thus obtained was found to contain about 3 g. of ceric oxide and minor quantities of other rare earths. The mesityl oxide was then contacted three times with water, each time with 20 ml., whereby an aqueous strip solution was obtained which contained 0.48 g. of thorium oxide and traces of rare earths. The mesityl oxide was ready for reuse.

It will be understood that this invention is not to be limited to the details given herein, but that it may be modified within the scope of the appended claims.

What is claimed is:

1. A process of separating and recovering thorium, uranium and rare earth values including cerium values from monazite sand, comprising mixing finely ground monazite sand with concentrated sulfuric acid at elevated temperature whereby a slurry is obtained; diluting the slurry; separating the solution of the slurry, the monazite sulfate solution, from the undissolved residue; adjusting the acidity of said monazite sulfate solution to a pH value of between 0.4 and 3; adding oxalic acid anions to said monazite sulfate solution whereby the thorium and the rare earth values precipitate as the oxalates; separating the oxalate precipitate from the uranium-containing oxalate supernatant; drying the oxalate precipitate; calcining the oxalate precipitate whereby the oxalates are converted to the oxides and the cerium to the tetravalent state; dissolving the calcined precipitate in nitric acid whereby a monazite nitrate solution is formed; contacting said monazite nitrate solution with tributyl phosphate whereby an organic extract phase containing the cerium and thorium values and an aqueous raffinate containing the other rare earth values are obtained; separating the organic extract phase from the aqueous raffinate; and back-extracting said cerium and thorium values from said organic extract phase with an aqueous medium.

2. The process of claim 1 wherein the sulfuric acid has a concentration of about 93 percent by weight and is used in an amount of from 2 to 2½ times the weight of the monazite and, the temperature for monazite-sulfuric acid reaction is about 200° C., and the slurry obtained thereby is diluted with ten parts by weight of water per one part of monazite sand.

3. The process of claim 1 wherein the pH of the monazite sulfate solution is adjusted to a value within the range between 1.1 and 1.5.

4. The process of claim 3 wherein pH adjustment is carried out by diluting with from 4 to 4.5 volumes of water per volume of monazite sulfate solution followed by the addition of ammonia.

5. The process of claim 1 wherein the oxalic acid anions are added in the form of saturated aqueous solution of oxalic acid in an amount in excess of that stoichiometrically required.

6. The process of claim 1 wherein the oxalate supernatant is contacted with octyl pyrophosphoric acid whereby the uranium is taken up by an extract phase, the extract phase is separated from the uranium-depleted oxalate supernatant and then contacted with an aqueous solution of hydrogen fluoride and ferrous sulfate whereby uranium tetrafluoride precipitates, and the uranium tetrafluoride is then separated from the aqueous solution.

7. The process of claim 6 wherein the octyl pyrophosphoric acid is added in the form of a solution in kerosene having a concentration of from 0.25 to 10 percent by volume.

8. The process of claim 1 wherein the oxalate precipitate is dried at about 125° C. and calcined at about 500° C.

9. The process of claim 1 wherein the calcined oxalate precipitate is dissolved in an excess of nitric acid of a concentration of from 7 to 9 N.

10. The process of claim 9 wherein the nitric acid concentration is 8 N.

11. The process of claim 1 wherein the monazite nitrate solution is contacted with undiluted tributyl phosphate which has been equilibrated with 8 N nitric acid.

12. The process of claim 1 wherein the organic extract phase is contacted with a solution of sodium nitrite whereby the cerium values are back-extracted, the aqueous cerium solution obtained thereby is separated from the cerium-depleted organic extract phase and the organic extract phase is then contacted with water whereby the thorium is back-extracted.

13. The process of claim 12 wherein the sodium nitrite solution has a concentration of about 0.1 M.

14. The process of claim 1 wherein the organic extract phase is contacted with dilute sulfuric acid containing sodium nitrite whereby the cerium and thorium values are back-extracted, the aqueous cerium-thorium solution thus obtained is separated from the depleted tributyl phosphate, the aqueous solution is then contacted with mesityl oxide whereby the thorium is taken up by the mesityl oxide while the cerium remains in the aqueous solution, and the mesityl oxide-thorium solution is separated from the aqueous cerium solution.

15. The process of claim 14 wherein the dilute sulfuric acid has a concentration of about 2 percent.

16. The process of claim 1 wherein the organic extract phase is contacted with dilute sulfuric acid containing sodium nitrite whereby the cerium and thorium values are back-extracted, the aqueous cerium-thorium solution thus obtained is separated from the depleted tributyl phosphate, the aqueous solution is concentrated and saturated with aluminum nitrate, the concentrated aqueous solution is contacted with mesityl oxide whereby thorium and cerium values are taken up by the mesityl oxide, the mesityl oxide solution is separated from the aqueous solution, the mesityl oxide solution is contacted with a nitric acid-aluminum nitrate solution dilute as to both whereby the cerium is back-extracted from the thorium-containing mesityl oxide, the aqueous cerium solution is separated from the mesityl oxide thorium solution, the mesityl oxide solution is contacted with water whereby the thorium is back-extracted, and the depleted mesityl oxide is separated from the aqueous thorium solution formed.

17. The process of claim 16 wherein the aqueous solution for the back-extraction of cerium is 2 N in nitric acid and 2 M in aluminum nitrate.

18. A process of separating and recovering thorium, uranium and rare earth values including cerium values from monazite sand, comprising mixing finely ground monazite sand with from 2 to 2½ parts by weight, per one part of monazite, of a 93-percent sulfuric acid at 200° C. whereby a slurry is obtained; diluting the slurry with about 10 parts of water per one part of monazite; separating the solution of the slurry, the monazite sulfate solution, from the undissolved residue; adjusting the acidity of said monazite sulfate solution to a pH value of between 0.4 and 3 by diluting it with water to from 5 to 5.5 times its volume and adding ammonia; adding a saturated aqueous solution of oxalic acid to said monazite sulfate solution whereby the thorium and the rare earth values precipitate as the oxalates; separating the oxalate precipitate from the uranium-containing oxalate supernatant; contacting the supernatant with a 10 percent solution of octyl pyrophosphoric acid in kerosene; separating the uranium-containing octyl pyrophosphoric acid from the aqueous solution; back-extracting the uranium values from the octyl pyrophosphoric acid by contacting it with an aqueous solution of hydrogen fluoride plus ferrous sulfate; drying the oxalate precipitate at about 125° C.; calcining the oxalate precipitate at about 500° C. in the presence of air whereby the oxalates are converted to the oxides and the cerium to the tetravalent state; dissolving the calcined precipitate in an excess of nitric acid having a concentration of from 7–9 N whereby a monazite nitrate solution is formed; contacting said monazite nitrate solution with tributyl phosphate whereby an organic extract phase containing the cerium and thorium values and an aqueous raffinate containing the other rare earth values are obtained; separating the organic extract phase from the aqueous raffinate; back-extracting said cerium and thorium values from said organic extract phase by contacting it with a dilute sulfuric acid containing sodium nitrite; separating the aqueous solution of cerium and thorium values obtained from the depleted organic extract phase; contacting the aqueous solution of cerium and thorium with mesityl oxide whereby the thorium is taken up by the mesityl oxide while the cerium remains in the aqueous solution; and separating the mesityl oxide from the aqueous solution.

19. A process of separating and recovering thorium, uranium and rare earth values including cerium values from monazite sand, comprising mixing finely ground monazite sand with from 2 to 2½ parts by weight per one part of monazite, of a 93-percent sulfuric acid at 200° C. whereby a slurry is obtained; diluting the slurry with about 10 parts of water per one part of monazite; separating the solution of the slurry, the monazite sulfate solution, from the undissolved residue; adjusting the acidity of said monazite sulfate solution to a pH value of between 0.4 and 3 by diluting it with water to from 5 to 5.5 times its volume followed by the addition of ammonia; adding a saturated aqueous solution of oxalic acid to said monazite sulfate solution whereby the thorium and the rare earth values precipitate as the oxalates; separating the oxalate precipitate from the uranium-containing oxalate supernatant; contacting the supernatant with a 10 percent solution of octyl pyrophosphoric acid in kerosene; separating the uranium-containing octyl pyrophosphoric acid from the aqueous solution; back-extracting the uranium values from the octyl pyrophosphoric acid by contacting it with an aqueous solution of hydrogen fluoride plus ferrous sulfate; drying the oxalate precipitate at about 125° C.; calcining the oxalate precipitate at about 500° C. in the presence of air whereby the oxalates are converted to the oxides and the cerium to the tetravalent state; dissolving the calcined precipitate in an excess of nitric acid having a concentration of from 7–9 N whereby a monazite nitrate solution is formed; contacting said monazite nitrate solution with tributyl phosphate whereby an organic extract phase containing the cerium and thorium values and an aqueous raffinate containing the other rare earth values are obtained; separating the organic extract phase from the aqueous raffinate; contacting the organic extract phase with an aqueous 0.1 M solution of sodium nitrite whereby the cerium is reduced to the trivalent state and back-extracted into said aqueous solution; separating said aqueous cerium solution from the organic extract phase; contacting the organic extract phase with water whereby the thorium is back-extracted into the water; and separating the aqueous thorium solution from the depleted organic extract phase.

References Cited in the file of this patent

UNITED STATES PATENTS

| | | |
|---|---|---|
| 2,796,320 | Spedding et al. | June 18, 1957 |
| 2,815,264 | Calkins et al. | Dec. 3, 1957 |

OTHER REFERENCES

Show et al.: AEC Document ISC-407, January 1954, pp. 5–13.

Seaborg: The Actinide Elements, National Nuclear Energy Series, 1954, page 89.

Gresky: United Nations Publication, Geneva Conference 1955, vol. 9, pp. 505–510.